O. ANDERSON.
APPARATUS FOR MEASURING THE WEIGHT OF FLUID QUANTITIES.
APPLICATION FILED MAY 9, 1917.
1,266,543.
Patented May 21, 1918.
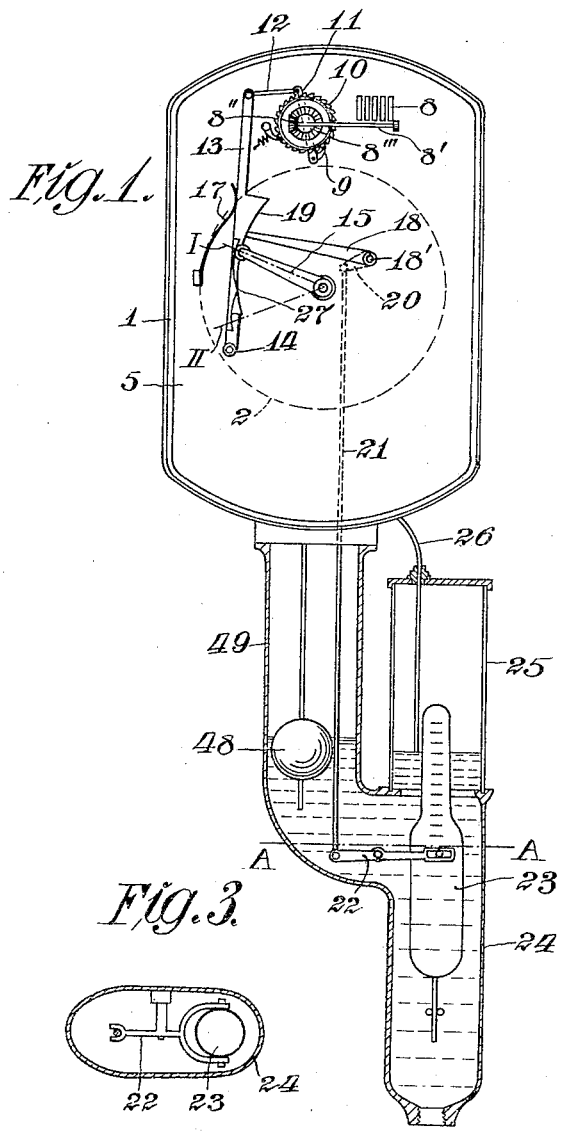

O. ANDERSON.
APPARATUS FOR MEASURING THE WEIGHT OF FLUID QUANTITIES.
APPLICATION FILED MAY 9, 1917.
1,266,543.
Patented May 21, 1918.
2 SHEETS—SHEET 2.
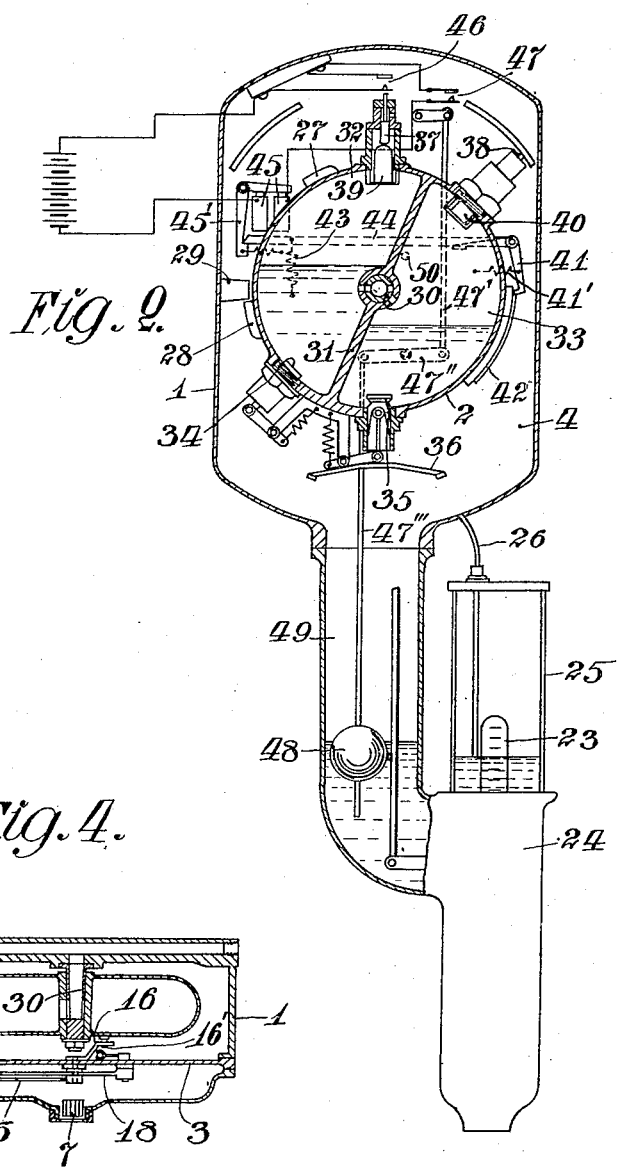

UNITED STATES PATENT OFFICE.

OSCAR ANDERSON, OF RÅSUNDA, SWEDEN.

APPARATUS FOR MEASURING THE WEIGHT OF FLUID QUANTITIES.

1,266,543.  Specification of Letters Patent.  Patented May 21, 1918.

Application filed May 9, 1917. Serial No. 167,575.

*To all whom it may concern:*

Be it known that I, OSCAR ANDERSON, a citizen of the Kingdom of Sweden, residing at Råsunda, Sweden, have invented new and useful Improvements in Apparatus for Measuring the Weight of Fluid Quantities, of which the following is a specification.

This invention relates to apparatus for measuring the weight of fluid quantities, more especially of quantities measured by apparatus measuring successively determined fluid quantities.

The object of the invention is the provision of an apparatus for measuring the weight of fluid quantities of the said kind, the register of which is connected with gearing adjustable in accordance with the specific weight of the fluid whose absolute weight is to be measured.

The invention is illustrated in the accompanying drawing in which—

Figure 1 is a front view of the apparatus, the front wall of the casing being removed and certain parts shown in section. Fig. 2 is a vertical sectional view of the fluid measuring apparatus. Fig. 3 is a cross-section on line A—A in Fig. 1. Fig. 4 is a central cross-section of the fluid measuring apparatus, certain parts of the gear of the apparatus being removed and other parts viewed from above.

Referring to Figs. 1 and 2, 1 is a closed casing containing a fluid measuring device of the type in which the fluid passes a rocking vessel or drum 2 which, on account thereof, is caused to turn in opposite directions between determined positions. The casing 1 is, by means of a partition wall 3 (Fig. 4), divided into two compartments 4 and 5, one 4 of which incloses the fluid measuring device, while the other compartment 5 contains the registers of the fluid measuring apparatus. As is shown in the drawing, this apparatus is provided with two registers, one 7, Fig. 4, of which serves to record the number of measurements effected by the vessel or drum 2, said register being of no importance for this invention. The other register 8 (Fig. 1) is actuated by the rocking measuring vessel by means of gearing consisting of a shaft 8' actuated by a pair of bevel wheels 8'' and 8''' a ratchet gear wheel 10 and a pawl 9, the bevel wheel 8''' being secured to the ratchet wheel 10. The pawl 9 is supported by an oscillating lever 11 preferably journaled to the shaft of the ratchet wheel 10 and connected, by means of a link 12, with a rod 13 pivoted to a pin 14. Bearing against the rod 13 is a roller secured to an arm 15, which is attached to a shaft passed through and journaled in the partition wall 3, said shaft being preferably located in alinement with the shaft of the vessel or drum 2. The shaft is, by means of an arm 16, connected with a pin 16' or the like secured to the measuring vessel 2 thus causing the arm 15 to turn synchronously with the said vessel. On each movement of the vessel in one direction or the other between its limit positions the arm 15 moves the rod 13 and consequently actuates the register 8, while a spring 17 bearing on the rod 13 returns the same when moved by the arm 15.

The movements of the rod 13 and the pawl 9 are regulated by a stopping arm 18 serving to limit such movements caused by the spring 17. One end of said stopping arm 18 bears against a curved surface 19 provided on the rod 13, while the other end of the stopping arm is secured to a shaft 18' journaled in the partition wall 3 and, by means of a link system 20, 21, 22, Fig. 1, connected with a densimeter 23, which is disposed in a vessel 24 connected with the compartment 4 of the casing 1 and passed by the fluid coming from the vessel 2. The vessel 24 supports a glass cylinder 25 into which the graduated portion of the densimeter reaches. A tube 26 connecting the glass cylinder 25 with the compartment 4 extends downward to a certain level in said cylinder for the purpose mentioned below.

The device described above operates as follows: When the vessel 2 turns and, consequently, the arm 15 is moved from one limit position, for instance I, to another limit position, for instance II, said arm moves the rod 13 outward by mounting the curved surface 27 of said rod, the spring 17 then returning the rod 13 to a position determined by the stopping arm 18. The higher the stopping arm 18 has mounted the curved surface 19, the smaller angle the rod 13 and the pawl 9 will turn. While the arm 15 actuates the rod 13, the pawl 9 turns the ratchet wheel a certain angle, whereas the pawl slides freely on the ratchet wheel, when the rod 13 is returned by the spring 17.

The temporary position of the stopping arm 18 determining the magnitude of the operative movement of the rod 13 and the pawl $q$ is in turn determined by the temporary position of the densimeter depending; on the other hand, upon the specific weight of the fluid. Consequently, the movement of the ratchet wheel mechanism will depend upon the product of the quantity of fluid measured by the measuring vessel and the specific weight of said fluid. Preferably, the device is so arranged, that the register 8 indicates directly the absolute weight of the measured quantity of fluid. In order to obtain an exact operation of the device it will be necessary that the fluid level in the vessel containing the densimeter be constant since otherwise the densimeter will raise and descend with said level. It will, however suffice, if the level is the same at the moment, when the arm 15 commences to move the rod 13, the position of the rod thus corresponding, at the said moment, with the specific weight of the fluid.

This result will be obtained without further arrangements by using a fluid measuring apparatus of the construction shown in Fig. 2. In this apparatus the measuring vessel or drum 2 is journaled on a hollow shaft 30 forming the inlet conduit of the vessel, which may turn between two limit positions determined by two projections 27 and 28 on the vessel and a lug 29 disposed on the casing 1 and coacting with said projections. By means of a partition wall 31 forming the boss of the vesssel the latter is divided into two compartments 32 and 33. The shaft 30 is provided with lateral apertures and the boss with corresponding apertures through which apertures the interior of the shaft, in one limit position of the vessel, is connected with the compartment 32 and in the other limit position with the compartment 33. Each compartment of the vessel is provided with a fluid outlet valve 34 and 35 respectively which is normally kept closed and is opened by the valve rod mounting a guiding surface 36. Besides, each compartment of the vessel is provided with an air valve 37 and 38 respectively supported by a float 39 and 40 respectively disposed in the corresponding compartment.

The measuring vessel 1 is provided with a locking device adapted to lock the vessel in its limit positions. Said locking device consists of a spring-actuated pawl 41 coöperating with the ends of a projection 42 disposed on the vessel, the said pawl being kept in locking position by means of a rod 44 actuated by a spring 43 in one direction and retained in operative position by the armature 45′ of an electromagnet 45, when not excited. The circuit of the electromagnet 45 contains two contacts 46 and 47, one 46 of which is controlled by the aforesaid air valves 37 and 38, while the other contact 47, by the aid of a link system 47′, 47″, 47‴, is controlled by a float 48 disposed in a tube 49 connecting the compartment 4 of the casing 1 with the densimeter vessel 24.

The fluid measuring apparatus described above operates as follows: When the vessel 2 is in its one limit position, shown in Fig. 2, the outlet valve 35 of the compartment 33 is opened, and, consequently, the fluid contained in said compartment flows down into the tube 49, while the other compartment 32 is connected with the interior of the hollow shaft 30, fluid thus flowing through the shaft into the compartment 32. When this compartment is filled, the float 39 raises thereby closing the air valve 37 and at the same time closing the contact 46. The fluid flowing out of the compartment 33 fills the tube 49 to a certain level, which is lowered, according as the fluid for consumption purposes is drawn from the vessel 24 or from a piping connected with this vessel. When the fluid in the tube 49 reaches a certain level, the link system 47′, 47″, 47‴ connected with the float 48 will close the contact 47 thus closing the circuit of the electromagnet 45, which attracts its armature 45′. On account thereof the armature releases the rod 44, which actuated by the spring 43 turns the pawl 41 out of engagement with the upper end of the projection 42. The vessel 2 thus released turns, owing to the weight of the fluid in the compartment 32, to the other limit position.

In the beginning of this movement the circuit of the electromagnet 45 is broken at the contact 46, and the electromagnet thus rendered currentless releases its armature. During the movement of the vessel 2 a projection 50 disposed thereon raises the rod 44, the spring actuated armature 45′ thus being capable of catching the end of the rod, and the pawl 41, actuated by the spring 41′, slides along the projection 42. At the end of the movement the rod of the outlet valve 34 mounts the guiding surface 36 thus opening said valve. The vessel, when reaching the other limit position, is stopped by the projection 27 striking the lug 29, and at the same time the pawl 41 catching the lower end of the projection 42 locks the vessel in said position. The compartment 32 is now emptied, while the compartment 33 is filled. As soon as this compartment is full and the quantity of liquid flown out of the compartment 32 has descended to the determined level in the tube 49, the circuit of the electromagnet 45 is again closed, and the play described is reiterated.

It will appear from the above description, that the vessel 2 cannot commence its movement until the fluid in the tube 49 has descended to a certain level. Consequently, if the space above the fluid in the glass cylinder 26 is connected with the compartment 1

4 of the casing 1 i. e. with the space above the fluid in the tube 49, the fluid levels in the glass cylinder and in the tube 49 will be equally positioned, and therefore the fluid level in the glass cylinder will always have the same position at the beginning of the movement of the vessel 2, or in other words, when the arm 15 commences to actuate the rod 13.

In order, however, to prevent the surface of the fluid in the glass cylinder from ascending to any appreciable extent above the said level and from causing the densimeter to perform other movements than those caused by the variations of the specific weight of the fluid, the tube 26 reaches so far down in the glass cylinder, that the end of the tube is situated at or nearly at the level, at which the float 48 closes the contact 47. As soon as the fluid in the tube 49 and the glass cylinder ascends so far, that the lower end of the tube 26 is closed, the air above the fluid in the glass cylinder will, at the rise of the fluid level in the tube 49, be compressed thus preventing the fluid from ascending to any appreciable extent in the glass cylinder. By this arrangement the result is, besides, attained that the fluid is prevented from touching and adhering to the portion of the densimeter positioned above the surface of the fluid at the moment of measurement, which otherwise would interfere with the operation of the densimeter.

Instead of the fluid measuring apparatus described above any other type of fluid measuring apparatus may be used, if provided with a register recording the measured quantity of fluid.

Having now particularly described and ascertained the nature of my said invention and in what manner the same is to be performed, I declare that what I claim is:

An apparatus for measuring the weight of fluid quantities, comprising a device for measuring determined quantities of fluid, a register in said device, an adjustable gearing actuating said register, a rocking fluid measuring vessel operating said gearing, locking means retaining said rocking vessel in certain positions, a float located in the measured fluid and adapted to release said locking means at a certain level of the fluid, a densimeter immerged in the measured fluid, and movable connections between said densimeter and said gearing adapted to adjust the latter to positions corresponding to the positions of the densimeter in the fluid.

In testimony whereof I have signed my name.

OSCAR ANDERSON.

Copies of this patent may be obtained for five cents each, by addressing the "Commissioner of Patents, Washington, D. C."